3,354,775
MICROPRINT VIEWER
Richard T. Erban, 145—38 Bayside Ave.,
Flushing, N.Y. 11354
Filed Aug. 12, 1964, Ser. No. 389,097
13 Claims. (Cl. 88—24)

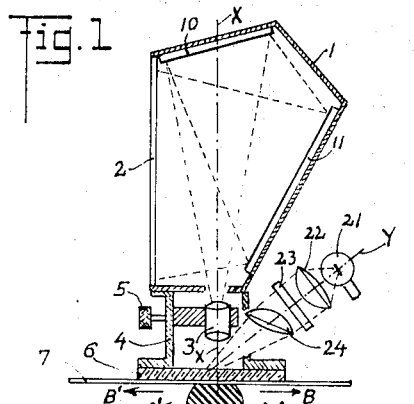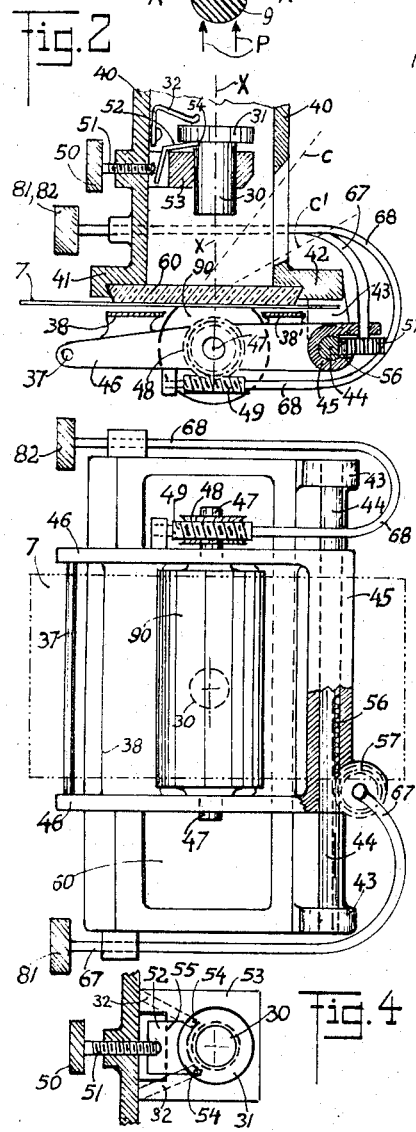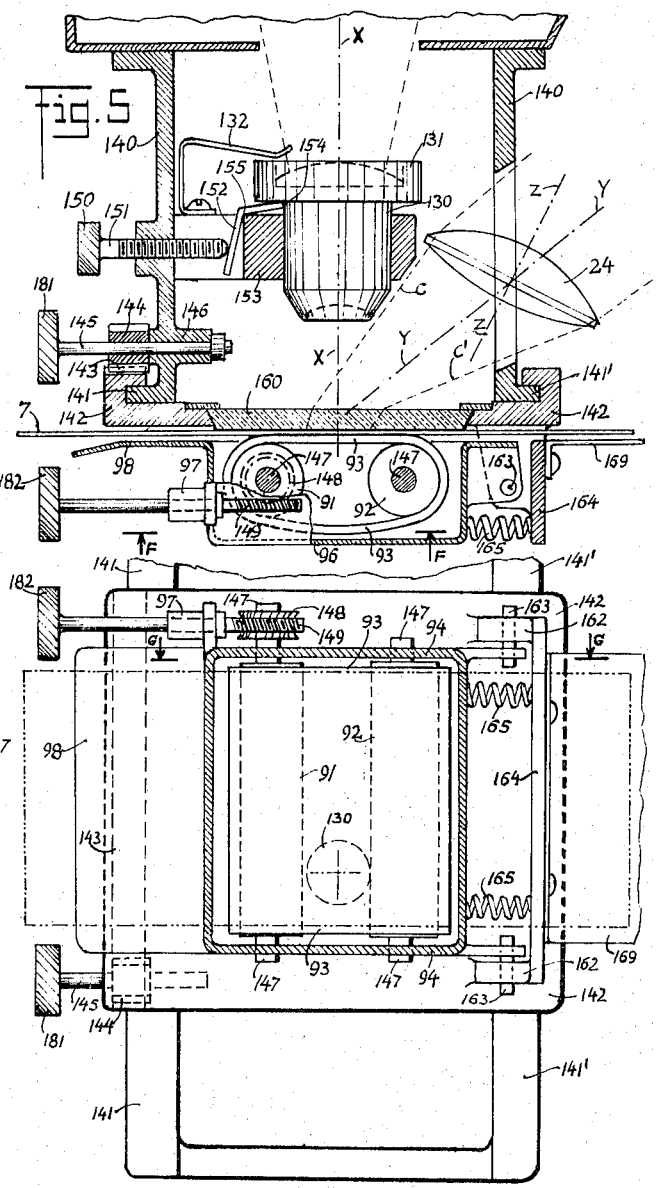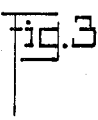

This invention relates to instruments for viewing enlarged images of opaque micro-records, such as microprints produced by suitable processes, photographic, offset print, or other, on the surface of a suitable carrier, which is usually a sheet of paper or thin cardboard.

When projecting enlarged images by reflected light, it is found that only a very small fraction of the illuminating light is gathered by the projection objective of conventional apertures of perhaps F:4 to F:6 such as used in microfilm viewers. This results in very dark images on the screen so that reading can be done only in a completely darkened room. The use of objectives of larger aperture, such F:2, increases the image brightness in accordance with known optical laws, but at the same time brings new difficulties due to the decrease of the depth of field inherent in such wide aperture lenses; unless the microprint is held in its correct position relative to the lens within rather small tolerances of 0.001 inch or less, the projected image gets fuzzy—runs out of focus—and this is found very objectionable by most users.

The present invention has therefore as its main aspect an improved structure for an opaque print projector or viewer which will permit the use of wide aperture lenses without requiring expensive construction previously necessary. This is accomplished by combining an optical objective with a mechanical stage in such manner that a selected portion of the sheet of microprints may at the will of the operator be presented to the optical objective with a high degree of accuracy so that sharp, clear images on the screen are produced and running out of focus is avoided even when moving the carrier sheet of the microprints from one position to another, while at the same time protecting the microprint from damage by scratching of its surface.

A further object of the invention is to provide a stage for holding the carrier sheet or card which is of rugged and simple design allowing for moderate cost of manufacture.

A still further object is to provide a structure for a focusing mount for the optical objective which gives the high accuracy required while having low manufacturing cost due to extremely simple design and few parts.

The manner in which this invention may be carried out is illustrated by way of examples in the drawings attached hereto, wherein:

FIG. 1 is a schematic section through a projection viewer with reflected light for opaque microprints, FIG. 2 is a section through the essential parts of one preferred form FIG. 3 is a bottom view of the structure shown in FIG. 2

FIG. 4 is a top view of the lens focusing mount shown in FIG. 2

FIG. 5 is a sectional view through a structure based on a modification of FIG. 2

FIG. 6 is a bottom view of the structure shown in FIG. 5.

Inspection of FIG. 1 shows a cabinet 1 which has at its front a projection screen 2 in vertical position. An objective 3 is positioned in known manner with respect to the screen 1 and the mirrors 10 and 11 so that an enlarged image will be seen on the screen whenever a sufficiently illuminated flat object is placed below the lens 3; this general arrangement is known in the art. The lens 3 is positioned within a focusing mount, operated by knob 5, which is fast to or forms part of the part 4; this part 4 is an extension of the stage structure which holds the transparent plate 6 at substantially right angles to the optical axes X of the optical lens 3; the distance between the lens 3 and the surface of the plate 6 (which may be of glass) is so arranged that a flat object—the microprint carrier—when pressed against said surface is approximately in the correct distance from the lens that a sharp image is projected onto the screen 2 so that only small adjustments of focal position of the lens 3 need be made by the knob 5. A condenser illuminating system provides an intensive beam of light of the selected portion to be viewed by adjusting this system so that its optical axis Y impinges upon the plate 6 near the point of intersection of the plate 6 with the optical axis X. The illuminating system comprises a light source 21, a first condenser lens 22, a heat-absorbing filter 23 and a second condenser lens 24. This last condenser lens 24 may be inclined with its optical axis relative to the optical axis of the system as indicated in the drawing, and as further more fully shown in FIG. 5 for the purpose of increasing the light intensity of illumination.

The glass plate 6 is shown solidly resting against the flanges of the stage 4, so that the distance between the lens 3 and the focal spot of the plate 6 remains an unchanging factor of the structure. The object to be viewed is illustrated by the sheet 7 which contacts the plate 3 from below and is held against it by the member 9, illustrated in the form of a rubber ball or roller which is slightly flattened out at the place of contact with the carrier sheet 7. It is supposed that the member 9 is pressed lightly against the sheet 7 by forces illustrated at P—P. It is clear that the same pressure P—P then exists between the sheet 7 and the glass plate 6. I have found that under these conditions, that is, contact between the sheet 7 and the glass plate 6 on one side, and contact under the same amount of pressure between the sheet 7 and a suitable substance, for example rubber, on the other side, there is established a system of differential friction between the two sides of the carrier 7, which holds true over a wide range of pressures P—P, from very small to rather substantial loads. As a result of this differential of frictional forces the carrier sheet 7 will follow any motion of the member 9 so that a motion of member 9 as by arrow A will produce an identical motion of sheet 7 as by arrow B; similarly, if member 9 is moved in direction A', the sheet 7 will follow with motion B'. In this system, the plate 6 stands rigidly still and the carrier sheet 7 slides upon the plate. Since the plate is correctly positioned (focused) with respect to the lens 3, so as to have a sharp image projected on screen 2, it is obvious that the image can never "run out of focus" no matter which portion of the sheet 7 is presented to the lens 3 by placing it near the intersection point of the optical axis X with the plate 6. Instead of sliding the member 9 in various directions parallel to the plate 6, a cylindrical roller may be used which for one set of directions is simply rotated around its geometrical axis, and for directions at right angles thereto, is caused to slide in the direction of its geometrical axis. These two motions will then produce a like motion of the carrier sheet in a rectangular co-ordinate system, one direction (x-axis) being right to left by sliding the cylinder 9 parallel to the surface of the plate 7, and the other direction (y-axis) being produced by rotating the cylinder 9 about its geometrical axis.

This is shown fully in detail in FIGS. 2 and 3. In order to facilitate identifying parts of the same or closely similar function, the parts are numbered with the same basic number of one decade higher, so that 4 becomes 40 and 41 will be a part of 40 or related to it.

The main body of the stage is 40 with flanges 41 and 42. These flanges hold rigidly the glass plate 60. The focusing mount for the lens 30 is formed by the parts 50, 51, 52, 53 and the spring 32. The part 53, in which the lens 30, 31 has a sliding fit for up-and-down movement, is rigidly fastened, or forms part of, the stage 40. Thus the lens 30 is held with a minimum of uncertainties with respect to the surface of the plate 60 and the critical distance between the microprint of the sheet 7, pressed against the plate 60, and the nodal point of the lens 30 is maintained correctly for any position of the sheet 7, assuring sharply focused images at all times. The focusing mount of the lens 30 is based on a closely held sliding fit of the lens-barrel in the corresponding bore of the part 53. This bore is the only really accurately machined feature, because it has to be at right angles to the glass plate surface 60 and in order to maintain this correct position, the lens barrel must have a close fit in the bore; it has been found that under these conditions of a close fit, it is perfectly feasible to move the barrel upwards against the force of a spring 32 by a lever 52, which contacts the shoulder 31 of the lens barrel 30 at the points 54 which are well outside of the geometrical axis of the barrel. This can be clearly seen in FIG. 4 where this detail is shown. The lever 52 is formed by a strip of flat stock, or a strip of sheet metal which is bent so as to fit over the edge of a cut-out in the part 53. It is clear that turning of the knob 50 causes the screw 51 to press against the lower half of the lever 52, causing a rocking motion of the lever about the edge of the part 53. The upper half of the lever will then lift the shoulder 31 and with it the entire lens barrel 30. This same structure for focusing movements of the lens barrel is also shown in FIG. 5 in larger scale and its operation is clearly understood as being the same as described for FIG. 4. Again, similar parts in FIG. 5 have similar numbers preceded by one hundred, so that the lens barrel is 130, the focusing screw is 150 etc. The edge of part 153, about which the lever 152 can make a rocking motion, is denoted 155, and the point of the lever 152 which lifts the shoulder 131 is denoted 154. While in FIG. 4 there are two springs 32 indicated in dotted lines, a single spring 132, placed so that it pushes downwards on a point approximately in line with the lifting point, or points, of the lever 152, will operate safely.

Referring again to FIGS. 2 and 3, it is seen that the flange 42 is provided at both ends with a bracket 43 (FIG. 3) and that a round bar 44 is supported by these brackets 43. Slideable upon this bar 44 is a carriage 45 having two arms 46 which extend across the width of the plate 60. At the front end the arms 46 are connected by a thin rod 37 which serves to move the part 45, 46 nearer or away from the plate 60. Journalled in the arms 46 at a place substantially in a plane parallel to the bar 44 and containing the optical axis of the lens 30 is a shaft 47, 47 which carries a roller 90; one of the ends of the shaft 47, 47 is provided with a worm gear 48 which meshes with a worm 49. A flexible shaft drive 68 connects the worm 49 to the knob 82, so that the shaft 47 may be rotated from the knob 82. The roller 90 is made of a suitable resilient material such as sponge rubber or other similar material having a coefficient of friction against paper which is substantially greater than that between paper and glass.

Inspection of the structure described will show that the motion of the sheet 7, when inserted between the plate 60 and the roller 90, is controlled by turning the knob 82 for a direction of motion across the plate 60, or at right angles to the axis of rotation of the roller 90. The sheet 7 is indicated in FIG. 3 by a line of dash-dot-dot to distinguish it from other parts of the structure.

The carriage 45 which is slideable upon the bar 44 is positioned in longitudinal direction of said bar by a rack and pinion drive; the pinion 57 is rotatably journalled in a lobe extending from part 45 and it meshes with a rack 56 cut into the side of the bar 44; a flexible shaft drive 67 connects the pinion 57 to the knob 81. Operation of the knob 81 will therefore cause a motion of the roller 90 in the direction of its longitudinal axis, and thereby a similar motion of the sheet 7. The roller 90 may be pressed slightly against the plate 60 either by a spring tending to move bar 37 upwards or by other suitable means, such as small magnets fastened to the arms 46 attracting them towards the flange 41 which for this purpose is provided with a magnetic lining (not shown); magnetic devices of this type are well known for holding frames, covers, cabinet doors etc. elastically in one end position while permitting their being moved in the opposite direction, against the magnetic pull, so that it is considered not necessary to illustrate this detail.

The structure shown in FIG. 5 differs from that of FIGS. 2, 3 in two modifications; while the plate 60 in FIGS. 2, 3 is held fully rigid by the stage, the plate 160 in FIG. 5 is mounted slideable in one direction with respect to the main body of the stage. The member 140 is provided with two flanges, 141 and 141' upon which a frame 142, 142 can slide with a close sliding fit. This frame 142 carries with it the plate 160, and it is controlled in its position by the rack and pinion drive 143, 144. The pinion 144 is connected to the knob 181 while the rack is part of the frame 142. Thus, movement of the sheet 7 from right to left side, as seen from the operator looking at the screen 2 of FIG. 1, is controlled by the knob 181. Motion of the sheet 7 at right angles thereto is controlled by a belt 93 which is supported by two rollers, 91 and 92 respectively. These rollers may be made of hard material, while the belt is of resilient material such as rubber or a suitable plastic. It is advantageous to use a belt of substantial thickness, so that it tends to keep a somewhat circular shape before being put over the rollers. This results in the part of the belt between the two support rollers bulging out slightly, as indicated in FIG. 5 at the lower portion of the belt (i.e. the part not contacting the sheet 7) because this same amount of bulging when pressed against the sheet provides a substantially uniform pressure over a moderately large area of the sheet to hold it in light contact with the surface of the plate.

The two rollers, 91 and 92, are journalled in a box shaped support by means of shafts 147. The box shaped support is hinged by pins 163 to pivot lugs 162 which extend from the frame 142. A flat bar 164 connects the two lugs 162 and serves as support for two springs 165, 165 which bear against the rear wall of the box 94, 94, thus causing the two rollers 91, 92 and the belt 93 to be moved upwards for pressing the sheet 7 against the plate 160. The roller 91 has one of its shafts 147 provided with a worm gear 148 which meshes with a worm 149. An extension of this worm 149 is journalled in the hub 97 fastened to the front wall of the box 94. A knob 182 therefore controls the rotation of the roller 91 and through it of the belt 93, which causes motion of the sheet 7 back and forth across the plate 160, that is a motion at right angles to the motion controlled by the knob 181. Note that the section of the box and rollers etc. in FIG. 5 is taken as indicated by the arrows marked G—G in FIG. 6, while the section of the box 94 as shown in FIG. 6 is taken as indicated by the arrows marked F—F in FIG. 5. Outside of this partial section, FIG. 6 is a straight bottom view of FIG. 5. Extensions 98 in front of the box 94 and 169 at the rear of bar 164 serve to support the sheet 7 during the loading or inserting it under the plate 160. It should be pointed out that the system of supporting the carrier sheet 7 between a glass plate and a removable resilient member (9, 90, 93) has the added advantage that the sheet 7 can be positioned in a coarse manner when inserting it, and that likewise, the removal of the sheet can be effected from any position of the control slide, whether it be the system illustrated in FIGS. 2 and 3 or the modification illustrated in FIGS. 5 and 6. This is a great saver of time as against other systems where the microprint sheets are positioned by inserting them between rollers so that they have to be cranked in or out all the way. When comparing data which are carried by several sheets, the time saved in "loading" and "unloading" may amount to more than the actual time for viewing, and become an important factor in deciding on the type of viewer to buy.

It is also seen that in the design of FIGS. 2 and 3 the control knobs for both movements are stationary and remain fixed on the main stage body; in the modification illustrated in FIGS. 5 and 6, one control knob is stationary (181) while the other, 182, travels with the slide. The stationary control can easily be made to travel also with the slide by reversing the position of rack and pinion 144, 143, so that the pinion 144 is carried by the slide frame 142 while the rack 143 is fastened to the stage body 140, 141. And, conversely, both controls can be made stationary, similar to the design of FIGS. 2 and 3, by providing a stationary knob 182 and connecting it by a flexible shaft drive to the worm 149, in a way similar to the drive between knob 82 and worm 49 shown in FIGS. 2 and 3.

In FIG. 5 there is also illustrated the preferred position of the illuminating light beam C, C' with its optiaxis Y—Y, and the last condenser lens 24 with its optical axis Z—Z inclined with respect to the axis Y—Y in such way that the angle of incidence of the last condenser lens 24 with respect to the plane of the plate 160, which is a plane perpendicular to the optical axis of the projection objective, is substantially greater than the angle of incidence of the entire condenser system's optical axis Y—Y with respect to the same plate surface. It has been found that a substantial increase in the intensity of illumination of the microprint, and therefore a similar increase in the brightness of the projected screen image, is obtained by suitable inclination of the condenser lens nearest to the illuminated object.

It is understood that while the foregoing specification and drawings are given as illustrative examples of preferred forms of embodiments of this invention, there are many other forms of structures in which the basic principles of this invention may be carried out. All of these forms comprise as basic elements a transparent plate positioned intersecting the optical axis of the projection objective and extending in at least one direction for the full width of the carrier sheet microprint serving as a support for this sheet and resilient means pressing the carrier sheet against the transparent plate, with the resilient means constructed to move the carrier sheet relatively to the plate in at least one direction thereof; and the movement of the carrier sheet relatively to the plate being obtained through the differential effect of friction between the glass surface and the carrier sheet on one side and between the sheet and the resilient movable control means on the other side.

The improvements described in focusing mounts for projection objective while of particular advantage in opaque microprint projectors may also be used in combination with other projection viewers. The improvement in intensity of illumination obtained by special positioning of the condenser lens nearest to the illuminated object may likewise be used in combination with projectors for opaque objects.

What I claim is:

1. In combination with a microprint viewer for opaque microrecords, a stage for holding said micro records in operator controlled position, said stage comprising a plate of transparent material and a first control means adapted to hold said records resiliently against said plate, at least a portion of said control means being movable relatively to said plate in at least one direction parallel to the surface of said plate while resiliently pressing said micro records against said surface, and a second control means adapted to superimpose upon said first control means a movement at substantialy right angles to the direction of said first control means movability with respect to said plate.

2. A viewer of the type referred to comprising an optical objective and a stage for holding a sheet of microprint adapted for presenting a selected part of said sheet to said optical objective for projecting an enlarged image of said selected part, said stage comprising a transparent plate of material having a low coefficient of friction with respect to said sheet of microprint, means for resiliently pressing said sheet against the surface of said plate on its side opposite to said objective, at least a part of said means being adapted for imparting a controlled sliding motion relative to said surface to said sheet of microprint by providing a material having a substantially high coefficient of friction with respect to the microprint sheet for that portion of said means which is in contact with said sheet holding it against said plate.

3. In combination with an instrument for viewing opaque micro records, a stage comprising a transparent plate and control means having movable portions thereof adapted to hold by resilient pressure said micro records against said transparent plate, said movable portions being constructed to impart to said micro records a controlled sliding motion coplanar with the surface of said plate.

4. A viewer in accordance with claim 3 in which said control means comprise a substantially straight cylindrical roller mounted rotatable about its longitudinal axis, a first operable means adapted to transmit controlled rotary motion to said roller, a second operable means adapted to transmit controlled longitudinal motion to said roller, the peripheral portion of said roller being made of a resilient material having a friction coefficient with respect to the material of said micro record substantially greater than the friction coefficient between said micro records and said transparent plate.

5. A viewer for micro records positioned upon the surface of an opaque carrier sheet, comprising an optical objective, a stage for holding said carrier sheet in operator controlled position with respect to the optical axis of said objective, said stage including a frame slidable thereon in a direction perpendicular to said optical axis, said frame supporting a transparent plate so as to be movable coplanar and in unison therewith, rotatable means having a resilient peripheral portion adjacent said plate, said last named means being pivotally supported by said frame for varying the spacing between said resilient peripheral portion and said plate whereby said carrier sheet after insertion into said spacing is resiliently pressed against said plate, and operator controlled means for transmitting rotary motion to said peripheral portion whereby a sliding motion relative to said plate is imparted to said carrier sheet.

6. A viewer for micro records carried on the surface of an opaque sheet in accordance with claim 5, wherein said rotatable means comprise two cylindrical rollers rotatably journalled upon parallel shafts between parallel walls of a support member, said support member being pivotally hinged to said sliding frame, said hinge axis being parallel to said shafts, a belt of resilient material placed upon said two rollers so as to transmit rotary motion from one to the other, a portion of said belt being adjacent to said transparent plate and adapted to hold with a resilient pressure said sheet against said plate after inserting said sheet between said belt and said plate, a first operator controlled means for effecting the sliding motion of said frame and transparent plate relatively to said stage, and a second operator controlled means adapted to cause rotary motion of said cylindrical rollers whereby that portion of said belt which is in contact with said sheet imparts to said sheet a sliding motion coplanar to said plate in a direction at right angles to the direction of the sliding motion of said frame upon said stage.

7. Apparatus for focusing an optical objective, said objective comprising a cylindrical lens barrel, a mount supporting said lens barrel for axial movement, said mount having a straight edge which extends at right angles to the axis of said lens barrel, a generally L-shaped lever positioned with the apex of said L engaging said straight edge for limited pivotal movement thereon, one of the legs of said lever engaging said lens barrel to cause said axial movement thereof in one direction, a spring yieldingly urging axial movement of said lens barrel in the other direction, and a focusing screw positioned to press adjustably against the other leg of said lever to move said lens barrel against the action of said spring.

8. A projection viewer for opaque microprints, comprising an optical objective having a first optical axis, a stage for holding one of said opaque prints with a selected portion thereof positioned to intersect said first axis with said first axis normal thereto, illuminating means for projecting a concentrated beam of light upon the surface of said print within an area surrounding the intersection point of said first axis with said print, said illuminating means including a source of light and a condenser system having a second optical axis, said condenser system comprising at least one optical lens having its axis in alignment with said second axis, said second axis being inclined at an acute angle with respect to said print surface, said second axis intersecting said print surface near the point of intersection of said first optical axis, the lens of said condenser system which is nearest to said intersection point being positioned with its individual optical axis inclined to intersect the plane of said print surface at an angle which is more nearly normal to said plane than the angle of intersection of said second axis.

9. Apparatus according to claim 7, wherein the longitudinal axis of said focusing screw, if extended, would intersect the optical axis of said objective perpendicularly thereto.

10. A device of the class described, comprising: a transparent plate having a plane surface; microprint viewing means for projecting the image of an image bearing surface of an opaque sheet in contact with said plane surface; deformable resilient means yieldingly pressing said image bearing surface of said sheet into direct contact with said plane surface, the coefficient of friction between said resilient means and said sheet being greater than the coefficient of friction between said image bearing surface and said plane surface; and means for simultaneously displacing said resilient means and maintaining said image bearing surface pressed against said plane surface to cause relative movement between said image bearing surface and said plane surface.

11. A device of the class described, comprising: stage means including a transparent plate having a free plane surface; microprint viewing means for projecting the image of a microprint in contact with said plane surface; deformable resilient means comprising a portion engaging said microprint and pressing said microprint into engagement with said plane surface; spring pressed supporting means yieldingly urging said resilient means in engagement with said microprint; and means carried by said supporting means for simultaneously changing the portion of said resilient means which engages said microprint and maintaining said microprint yieldingly urged into said engagement with said plane surface.

12. A device according to claim 11, wherein said resilient means is a deformable cylinder laterally engaging said microprint, said means for changing said portion of said resilient means comprising means for rotating said cylinder about its longitudinal axis.

13. A device according to claim 11, wherein said resilient means comprises a deformable endless belt which, when free, assumes a generally circular shape, and in which said supporting means comprises two rollers with spaced parallel rotational axes over which said belt passes, one reach of said belt intermediate said rollers yieldingly pressing said microprint against said plane surface, said means for changing said portion of said resilient means including means for rotating at least one of said rollers.

References Cited

UNITED STATES PATENTS

| | | | |
|---|---|---|---|
| 2,685,227 | 8/1954 | Brietzek | 88—24 X |
| 2,700,917 | 2/1955 | Peters et al. | 88—24 |
| 2,711,669 | 6/1955 | Erban | 88—24 |
| 2,724,988 | 11/1955 | Peters | 88—24 X |

NORTON ANSHER, *Primary Examiner.*

V. A. SMITH, *Assistant Examiner.*